Feb. 20, 1968  N. FORREST  3,369,949
METHOD OF MAKING A FLEXIBLE MOLD
Filed Aug. 8, 1966

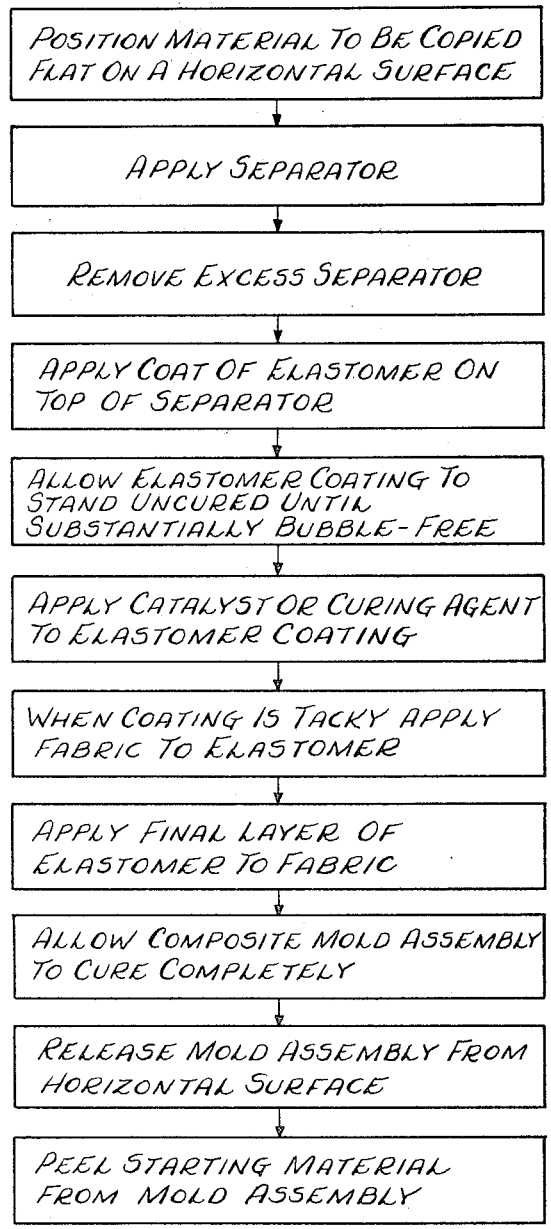

INVENTOR.
NORMAN FORREST
BY
*Oldham & Oldham*
ATTORNEY

United States Patent Office 3,369,949
Patented Feb. 20, 1968

3,369,949
METHOD OF MAKING A FLEXIBLE MOLD
Norman Forrest, 21 New York Ave.,
White Plains, N.Y. 10606
Continuation-in-part of application Ser. No. 195,869, May 18, 1962. This application Aug. 8, 1966, Ser. No. 570,950
16 Claims. (Cl. 156—232)

ABSTRACT OF THE DISCLOSURE

A flexible mold is made from a textured surface material by positioning the material flat and applying a separator to the textured surface with a controlled amount of the separator being applied to such surface. Next a layer of liquid elastomeric substance is applied to the textured surface and substantially all of any entrapped air is enabled to escape from such liquid layer. Next a curing agent for the elastomeric layer is applied thereto and the material is permitted to cure at least partially. The mold can be completed by applying a backing material to the elastomeric layer and the resulting flexible mold assembly is cured and ultimately separated from the material being copied.

---

This application is a continuation-in-part of U.S. patent application Ser. No. 195,869, filed May 18, 1962, now abandoned.

The present invention relates to a novel flexible, elastic mold and to a method for making a mold in which fabrics and the like can be copied by casting therein various plastics, such as vinyl plastisols.

In recent years there has been considerable interest in preparing synthetic plastic materials which simulate the appearance of natural fabrics, laces, mattings, and other textured surfaces. Various types of molds and numerous methods have been proposed heretofore, but most of these proposals have not been practical or successful in terms of large scale commercial operations. U.S. Patents 3,098,262 and 3,141,051 describe the numerous problems encountered in the prior efforts to manufacture plastic fabrics and other textured materials which simulate the corresponding natural material. The latter patent also describes a number of procedures which were attempted in an effort to produce the desired plastic material. One of the most serious disadvantages of the prior art suggestions resides in the unavailability of molds having molding surfaces which are substantially exact negatives of the fabric or other textured surface being copied. In the absence of such molds, the final plastic products always differ somewhat from the natural materials that are being simulated. It is not surprising, therefore, to find that the known mold making procedures have involved elaborate and painstaking techniques. In U.S. Patent 3,235,438, for example, the so-called "negative molds" have been prepared by a procedure which involves the formation of a primary negative mold by forcing sharp needles or bundles of sharpened steel rods into a thick block of lead, aluminum, clay, wax, wood or gelled plastisol; casting intermediate positive master molds from the small negative primary mold; joining these positive master molds together to form a large positive mold; and then producing the final large negative mold by pouring onto the positive mold surface an elastomeric resinous composition followed by solidification and separation. Sharp and needle-like piercing implements are also employed in the preparation of the mold or "embossing tool" described in U.S. Patent 3,141,051. Neither patent, therefore, utilizes the fabric or other textured material being simulated to form the mold.

One object of the present invention is to provide a flexible, elastic mold having a molding surface which is substantially an exact negative of at least the major lengths of the fibers or other portions of the fabric or other textured surface providing the top surfaces therein of the material being copied.

Another object of the present invention is to provide an endless, flexible, elastic molding belt having a molding surface which is substantially an exact negative of the fabric being copied, and wherein the endless molding belt has the mechanical properties and high temperature resistance required in large scale, continuous commercial operations involving the fusion or setting up of vinyl plastisols and similar plastics in the mold.

Still another object of the present invention is to provide an endless, flexible, elastic molding belt having a molding surface characterized by exquisite detail and undercuts adapted to reproduce fabrics and other structured surfaces in castable plastics.

A further object of the present invention is to provide an improved, relatively simple, inexpensive method for manufacturing a high grade, durable, long-lived and commercially practical mold of the type described.

A still further object of the present invention is to provide a method for making a mold of the type described in which the plastics formed in the mold will be strain-free and flat, wherein two or more colors can be laid down in registry, and wherein backing, foam, or fabric reinforcement can be readily applied.

These and other objects of the present invention will become readily apparent from the ensuing description and illustrative embodiments.

In general the novel molds of this invention are prepared from fabrics, laces, mattings, and other textured surfaces including, for example, brocaded silk or velvet, corduroy, suede, linens, wools, glass, cotton and the like. The fabric or other material being reproduced or copied is generally utilized in a standard fabric length, e.g. 100 feet, and a standard width, e.g., 54 inches.

The basic mold-making method of this invention comprises the following sequential steps: positioning the material being copied flat on a horizontal surface, usually applying a separator to the exposed or top surface of the fabric, removing excess separator from the fabric, applying a high temperature resistant elastomeric material to the fabric, removing substantially all of the entrapped air from the elastomer layer, applying a curing catalyst to this layer, and then applying a backing to the partially cured elastomer layer. After the composite mold has fully cured and/or set, it is separated from the fabric and is generally subjected to a separate heat treatment, as described below, prior to being used for molding purposes.

For a better understanding of the invention reference should be had to the accompanying drawings wherein:

FIG. 1 is a block diagram illustrating the various steps of one embodiment of the invention;

Figure 3:
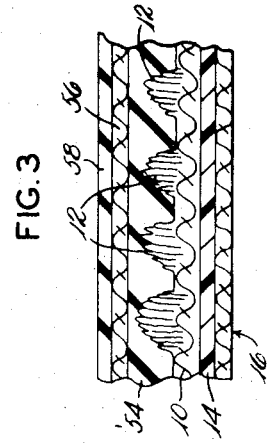
FIG. 3 is an enlarged fragmentary cross-sectional view of the built-up laminate produced during the performance of the method of the invention.

In accordance with one feature of the present invention, the fabric employed as the starting material for forming the mold is impervious to air. When the fabric used is one that is not impervious to air, it is necessary to coat its back with a flexible, air-impervious material, such as nitrocellulose, cellulose acetate, or the like, or to attach the fabric with a flexible air-impervious adhesive, such as is sold under the trademark "Pliobond," to a cotton sheeting or canvas backing. Referring to FIG. 3 the fabric material 10 to be copied is a piece of corduroy with parallel rows of piled-like fabric 12 secured by a flexible, air-impervious adhesive 14 to cotton sheeting 16. The latter procedure is generally preferred since it assists in holding the fabric material in a flat smooth position, which is important in the practice of the novel method.

Figure 2:
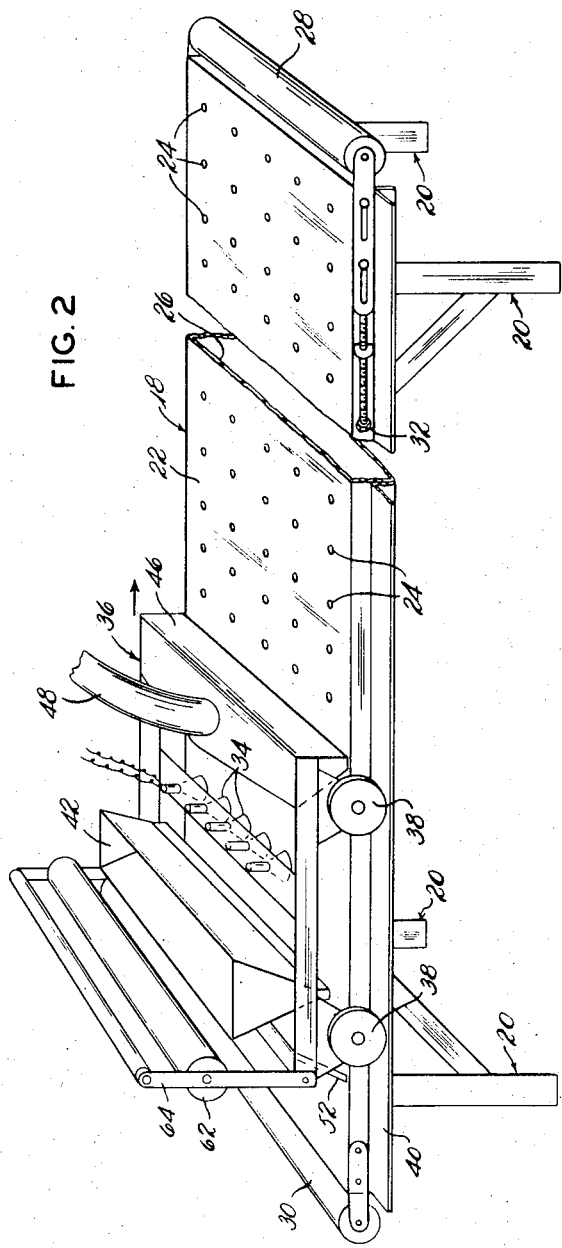
FIG. 2 is a perspective view, partially broken away, of an apparatus adapted to perform the method of the invention.

The impervious fabric material is then positioned and held flat and level. FIG. 2 illustrates a flat level table indicated as a whole by the numeral 18 mounted upon suitable legs 20 and formed with a flat level upper surface 22 for receiving the fabric material 10 and its impervious backing 14 and sheeting 16. It will also be understood that the impervious means, or adhesive 14 may be applied to backing sheeting 16, and any adhesive 14 may be used to attach the sheeting 16 to the fabric 12. The table surface 22 may be formed with a plurality of holes 24 therein, and the underside of the table with a chamber 26 connected to the holes 24, so that a vacuum connected to the chamber 26 operates through the holes 24 to hold the fabric material 10 flat and level on the table. It is also possible to cement, pin, or tape the fabric material 10 to the table top 22, but the vacuum is normally more convenient. It is also possible to loop the fabric material 10 into an endless belt about the rollers 28 and 30 positioned at the ends of the table and with adjusting screws 32 being provided for tightening the roller 28 to hold the fabric material 10 in very flat and smooth relation.

The fabric material 10 is then coated and impregnated with a low melting point separator, preferably a low-melting wax, such as paraffin or carnauba wax. Although the low-melting wax is referred to as a separator, it also has other important functions including reduction of the porosity of the fabric being copied and prevention of the molding material from flowing completely into all of the undercuttings of the fabric. Unless the latter problem is avoided, the subsequent separation of the finished mold from the fabric would be all but impossible. The separator is applied to the fabric material which preferably has been heated to about 150 degrees Fahrenheit. In one form of apparatus for practicing the invention, and as is shown in FIG. 2, a plurality of heat lamps 34 are mounted upon a carriage indicated as a whole by the numeral 36 having wheels 38 which ride on tracks 40 at the sides of the table 18. In the apparatus of the drawing only one row of heat lamps 34 has been illustrated, but in the practice of the invention a plurality of rows of heat lamps is normally utilized.

When the fabric material 10 has been heated to the temperature indicated, the separator, usually in the form of a hot liquid, is applied to its surface. One convenient manner of accomplishing this is to provide a trough 42 on the carriage 36 through which the liquid paraffin can be distributed. The carriage 36 with the heat lamps 34 still turned on is passed up and down over the fabric material 10 keeping the paraffin completely liquid and allowing it to coat and/or impregnate at least the surface of the fabric material 10.

An important feature of this invention involves removing excess separator from the surface of the fabric material 10. This can be achieved by means of a hot air stream. The hot air is provided at a controllable pressure, usually at a gentle pressure, e.g., about 3 to 5 lbs. air pressure. In general, relatively wide or large nozzles are employed in the air supply circuit to achieve the gentle sweeping action and to avoid strong air blasts. By such controllable blowing excess separator is removed while a sufficient amount of separator is retained, which cools to form a solidified coating on the material being copied thereby enabling exact reproduction thereof. Carriage 36 is provided with a forwardly and downwardly slotted manifold 46 supplied with hot air by a flexible conduit 48 so that as the carriage 36 is moved over the fabric material 10 the excess liquid separator is swept or blown by the air blast ahead of the carriage. The blowing with hot air is continued by means of a plurality of sweeps of the carriage 36, usually with the heat lamps 34 still lighted until about 60% to 75% of the original fabric surface is above the separator level and this determines the depth of the surface of the fabric to be copied. But, such exposed fabric is also coated and/or impregnated with separator to facilitate separating the fabric from the mold to be produced. When less than this amount of fabric surface is exposed, the products made in the molds may have an embossed appearance; when more surface is exposed, there is the possibility that the elastomer used to form the mold may flow into the undercuttings of the fabric, although some of the undercuttings in the fabric at its surface areas will be reproduced. The amount of fabric surface that is exposed may be measured by observation or by forming a test mold using silicone putty. Another function of the hot air stream is to aid in lifting up the surface fibers of the fabric to facilitate the coating or impregnating of the upper surface portion of the fabric being copied with the silicone rubber or other elastomeric material.

Although the use of the separator is a critical step for copying a majority of fabrics, it is sometimes possible with a very closely-woven flat fabric material having no tufts not to employ a separator.

It is also possible, under certain conditions, to remove the excess separator using paper or cloth toweling, plus heat and pressure, for absorbing the separator out of the fabric material 10 and into the toweling. This manner of removing the excess separator is normally not as satisfactory as the hot air blast because the toweling procedure tends to distort the fabric material 10 more than the hot air blast.

In FIG. 3 no effort has been made to illustrate the presence of the separator because it generally coats and/or impregnates at least the surface of the fabric material 10 rather than form a coating extending beyond the outer boundaries of the fabric material.

The next step in the mold-forming method of this invention comprises the application of a coating of an elastomeric material to the exposed surface of the fabric. Elastomeric resins such as silicone rubber, or its copolymers, neoprene, flexible epoxy, urethane fluoroplastics and the like can be effectively employed. The use of silicone rubber has been found to be particularly advantageous in that the resulting molds have the desired flexibility, high temperature resistance, and long life in actual operations. Conventional silicone rubber has a molecular weight ranging from about 300,000 to 750,000, as high as 3 million, whereas RTV silicone rubber has a molecular weight of from about 2000 to 3000. The latter, which vulcanizes in the presence of a catalyst at room temperature, is largely made up of dimethyl siloxanes, and solidifies as a result of siloxane crosslinking. RTV 30, a liquid silicone rubber having a viscosity within the range of about 200 poises to 320 poises is especially preferred for use in the manufacture of the novel molds of this invention. The literature teaches that when RTV silicone rubbers are employed for preparing molds, there is no need to use a separating or parting agent, such as wax. As previously discussed, however, one feature of the present invention resides in the discovery that in order to effectively obtain a negative mold directly from the fabric or other structured material being copied, it is necessary to employ a separating agent. Conventional procedures may be employed in applying the silicone rubber to the fabrics. Thus, for example, the silicone rubber may be applied by the use of a standard spreader, sprayer, or the like. In general, the depth of silicone rubber coated on the fabric will range from about 0.020 to 0.250 inch, and preferably from about 0.050 to 0.090 inch. As shown in FIG. 2, the silicone rubber may be spread on the fabric by means of doctor bar 52 mounted on carriage 36, with the trough 42 and doctor bar 52 serving to deposit the coating of silicone rubber on the fabric as the carriage 36 is moved along the table 18. The coating of silicone rubber is identified in FIG. 3 of the drawings by the numeral 54.

It will also be understood that the silicone rubber which is preferably used to form the molds of this invention is resistant to relatively high temperatures, e.g., up to 700° F., which is considerably higher than the fusing or setting up temperatures for the vinyl plastisols usually employed in the manufacture of the simulated fabric products. In actual operations, it has been found that the coating of silicone rubber coats and/or impregnates the tufts and fibers of the fabric material 10, closely surrounding the upstanding fabric piles 12, and thereby actually outlining and fully surrounding these fibers even though they are materially undercut.

Although it is customary to admix a curing catalyst or agent to the silicone rubber prior to use in molding operations, it has now been found that in order to obtain a substantially exact negative mold of the fabric material being copied the curing catalyst should be added only after substantially all of the entrapped air has been removed from the silicone rubber. If the silicone rubber is cured too quickly, the entrapped air will mar the surface of the mold and prevent the exact simulation sought to be achieved by the present invention. Although the silicone rubber may be subjected to debubbling prior to being applied to the fabric by treatment with vacuum or other debubbler equipment, entrapped air may still be encountered during the step of applying the silicone rubber to the fabric. The presence of voids in the finished rubber mold is considered to be highly deleterious and can be overcome by applying the curing catalyst or agent in a separate and subsequent step. More specifically, it is generally necessary to permit the silicone rubber coating to remain in liquid form under ambient conditions for a period of at least 10 hours, and preferably from about 12 hours to 18 hours, to allow all of the entrapped air to escape. It will be understood, however, that the amount of time required to substantially eliminate the entrapped air may vary widely depending upon the viscosity of the silicone rubber and the thickness of the coating. A bubble-free condition is indicated when the top surface of the silicone rubber layer is smooth. The debubbling time may be reduced by applying a vacuum to the liquid silicone rubber after it has been applied to the mold.

The curing catalyst or agent employed will include the conventional materials such as dibutyl tin dilaurate, tin octoate, lead octoate, and the like. The catalyst or agent employed for curing is preferably in liquid form and may be applied to the silicone coating by spreading, spraying, etc. The coating of silicone rubber 54 is then allowed to gel, or start to cure to a tacky stage, which generally takes less than about 1 hour although it may take as much as 2 hours or more, and a backing material is applied to complete the mold body. The backing material may comprise additional silicone rubber having the same or a different viscosity, glass cloth or other fabric, etc. As is well known in this art, the backing or reinforcing material provides the mold with the required mechanical strength. The resulting composite mold structure is generally cured under ambient conditions for a time period ranging from about 24 to 72 hours, although the curing time is not a critical feature of this invention. The mold is then heated at about 400° F. to 450° F. to remove curing catalyst residues, volatile organics, low molecular weight silanes, etc.

In a preferred embodiment of this invention, the backing is provided by applying on top of the tacky silicone rubber coating 54 a layer of a reinforcing fabric 56, e.g., glass cloth, which has been pretreated with a conventional silicone primer to improve its adhesion to the silicone rubber.

A final layer of silicone rubber 58 is usually applied to the cloth 56 by means of the doctor bar 52 and tank 42, and the entire assembly is allowed to stand overnight to effect curing. As discussed above, the curing catalyst is added only after the silicone rubber has achieved a bubble-free condition. Adhesion between the layers is believed to occur as a result of cross-linking across the interface through the open mesh fabric 56.

After the mold assembly has been cured, the vacuum is released from the table 18 and the entire mold assembly is picked up by suitable grips or jaws gripping the assembly at one end and turned over so that the silicone rubber layer 58 rests against the top of the table 22. The vacuum is reapplied. A corner of the fabric material 10 is pulled away from the silicone rubber mold, and the entire fabric material 10 is progressively peeled away from the belt and rolled up to leave the flat undistorted belt-mold in the manner described, rather than the belt-mold peeled from the cloth, to minimize distortion of the belt-mold.

Figure 4:
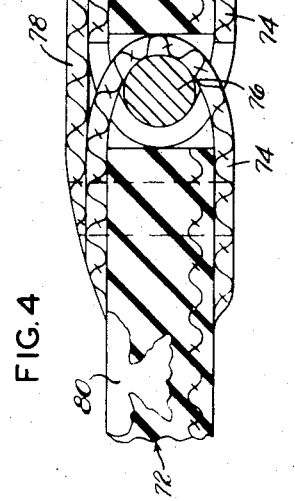
FIG. 4 is an enlarged fragmentary cross-sectional view through the completed mold of the invention and with this figure illustrating the ends of the mold joined together to form an endless belt.

As previously indicated, with the fabric material 10 removed from the upper surface of the belt-mold, which is still held flat on the table 22, the surface of the belt-mold is heated with the lamps 34 to burn out any residue of the separator and to insure the final setting up of the belt-mold. The ends of the belt may be trimmed and joined together, as seen in FIG. 4 to form an endless belt-mold. The belt-mold, indicated as a whole by the number 72, has cloth strips 74, which are U-shape and alternately notched, sewed to its ends to receive a locking pin 76. A sewed-on cloth cover 78 bridges the belt splice. By way of example, the number 80 indicates an undercut molding recess in the belt-mold 72, as for tufted velvet, and the numeral 82 indicates a recess for molding a corduroy rib.

The carriage 36 has been illustrated as including a roller 62 mounted upon pivotal handles 64, this roller being adapted to be moved down to engage with the reinforcing fabric 56 when it is applied to the top of the silicone rubber coat 54.

It is possible, as heretofore described, to make the fabric material 10 in the form of an endless belt supported smoothly and tightly over the rollers 28 and 30, with one of the rollers being driven to rotate the fabric material 10 as an endless belt. When this is done, the carriage 36 can remain stationary and the fabric material 10 moved as a belt during the various steps of the method as described. While many of the advantages of the invention are retained by the method last described, the method utilizing the flat bed 22 holding the fabric 10 stationary is generally preferred.

The novel elastomer molds prepared by the method described above are characterized by flexible molding surfaces which are substantially exact negative outlines or molds of the fibers or other structures forming the major lengths of the top portions of the fabric or other textured surface being copied. In addition, these molds have the mechanical strength, high temperature resistance, and other physical properties required in a flexible molding surface or flexible endless molding belt made therefrom. A further characteristic of the molds of this invention is the substantial absence of voids resulting from the entrapment of air during the mold forming procedure. As described in detail above, such novel elastomeric molds are attained by utilizing the fabric or other structured surface itself to form the negative molding surface and by employing the special processing steps and operating conditions previously outlined. It will also be understood that the molding surface is preferably silicone rubber, and that the resulting mold structures or assemblies can be effectively utilized to prepare simulated fabric products from synthetic thermoplastic or thermosetting resins, especially thermoplastics such as vinyl plastisols.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a flexible mold for copying fabrics, laces, mattings, or other material having a textured surface which comprises sequentially positioning a textured material flat on a horizontal surface and retaining it in a stationary position thereon, applying a liquid thermoplastic separator to the exposed textured surface of the material, controllably blowing hot air on the exposed surface of the material to remove any excess separator and to retain sufficient separator to form a solidified coating on the exposed textured surface of the material to enable reproduction thereof, applying a layer of a liquid elastomeric substance to said separator-coated surface, permitting the layer of liquid elastomeric substance to stand to enable substantially all of the entrapped air to escape from the liquid elastomeric layer, applying a curing agent to the liquid elastomeric layer after substantially all of the entrapped air has escaped from such layer, permitting the elastomeric layer to cure to a tacky condition, applying a backing material to the exposed surface of the tacky elastomeric layer to provide a flexible mold assembly, curing the resulting flexible mold assembly, and then separating the textured material being copied from the cured flexible mold assembly.

2. The method of claim 1 wherein the bottom surface of said textured material is initially coated with a layer of air impervious material and said textured material is retained in intimate contact with said horizontal surface by suction.

3. The method of claim 1 wherein said separator is paraffin wax and wherein the material is preheated prior to application of the separator thereto, and wherein a stream of hot air under a pressure of from about 3 to about 5 lbs. is blown against the separator material as it is carried by the textured surface of the material and the air stream is caused to move relative to the material to aid in obtaining a uniform deposit of separator thereon.

4. The method of claim 1 wherein said elastomeric substance is silicone rubber.

5. The method of claim 1 wherein the liquid elastomeric layer is allowed to stand uncured for a period of at least 10 hours to permit the escape of substantially all of the entrapped air.

6. The method of claim 1 wherein a reinforcing fabric is applied to said tacky elastomeric layer prior to applying the backing material.

7. The method of claim 1 wherein said backing material is a layer of substantially bubble-free elastomeric substance.

8. The method of claim 7 wherein said backing material is silicone rubber.

9. A method of making a flexible mold for copying fabrics, laces, mattings, or other material having a textured surface which comprises the following sequential steps:

positioning a textured surface material having an air impervious bottom surface flat on a horizontal surface, applying a low melting separator that has been heated to a temperature above its melting point to the exposed surface of said textured material, controllably blowing hot air on the separator-coated surface of the textured material to remove excess separator while retaining a sufficient amount of separator to solidify and form a coating on said textured surface, applying a layer of liquid silicone rubber to said separator-coated surface, permitting the escape of substantially all entrapped air from said liquid silicone rubber layer, applying a curing catalyst to the liquid silicone rubber layer, permitting the liquid silicone rubber layer to cure to a tacky condition, applying a reinforcing fabric material to said tacky silicone rubber layer, applying a second layer of liquid silicone rubber as a backing material to said reinforcing fabric, permitting the escape of substantially all entrapped air from the second silicone rubber layer, applying a curing catalyst to said second liquid silicone rubber layer, allowing the silicone rubber in the resulting flexible mold assembly to cure, and separating the textured material being copied from the cured mold assembly.

10. The method of claim 9 wherein said separator is paraffin wax.

11. The method of claim 9 wherein the bottom surface of said textured material is coated with an adhesive to form an air impervious layer.

12. The method of claim 9 wherein each layer of liquid silicone rubber is permitted to stand uncured for a period of at least 10 hours to permit the escape of entrapped air bubbles.

13. The method of claim 9 wherein the separated mold assembly is heated to effect a final curing.

14. The method of claim 9 wherein the reinforcing fabric is coated with a silicone primer.

15. The method of claim 9 where the material is preheated prior to applying the separator thereto.

16. A method of making a flexible mold for copying fabrics, laces, mattings, or other material having a textured surface which comprises sequentially positioning a textured material flat on a horizontal surface, applying a liquid thermoplastic separator to the exposed textured surface of the material, controllably blowing hot air on the exposed surface of the material to remove any excess separator and to retain sufficient separator to form a solidified coating on the exposed textured surface of the material to enable reproduction thereof, applying a layer of a liquid silicone rubber to said separator-coated surface, some air bubbles being formed in the lamination of the liquid layer on the separator-coated surface, permitting substantially of the entrapped air to escape from the liquid elastomeric layer by letting the liquid layer stand for at least 10 hours, applying a curing agent to the liquid silicone rubber, permitting the silicone rubber to cure to a tacky condition, applying a backing material to the exposed surface of the tacky silicone rubber layer to provide a flexible mold assembly, curing the flexible mold assembly, all of the foregoing steps being performed while the textured material is retained flat on a horizontal surface, and then separating the material being copied from the cured flexible mold assembly.

References Cited

UNITED STATES PATENTS

| | | | |
|---|---|---|---|
| 3,021,569 | 2/1962 | Lyman | 156—245 |
| 3,098,262 | 7/1963 | Wisotsky | 264—212 |
| 3,179,550 | 4/1965 | Friedman | 161—62 |
| 3,190,947 | 6/1965 | Norcross | 264—216 |

EARL M. BERGERT, *Primary Examiner.*

M. L. KATZ, *Assistant Examiner.*